United States Patent [19]

Heinzel

[11] Patent Number: 4,882,241
[45] Date of Patent: Nov. 21, 1989

[54] REDOX BATTERY

[75] Inventor: Angelika Heinzel, Freiburg, Fed. Rep. of Germany

[73] Assignee: Siemens Aktiengesellschaft, Munich, Fed. Rep. of Germany

[21] Appl. No.: 259,924

[22] Filed: Oct. 19, 1988

[30] Foreign Application Priority Data

Oct. 23, 1987 [DE] Fed. Rep. of Germany ....... 3735992

[51] Int. Cl.$^4$ .............................................. H01M 8/20
[52] U.S. Cl. ........................................ 429/19; 429/44; 429/107; 429/109
[58] Field of Search .................... 429/19, 40, 44, 101, 429/105, 107, 109

[56] References Cited

U.S. PATENT DOCUMENTS 3,996,064 12/1976 Thaller .
4,192,910 3/1980 Giner et al. .
4,270,984 6/1981 Giner et al. .
4,382,116 5/1981 Gahn et al. .
4,543,302 9/1985 Gahn et al. .

FOREIGN PATENT DOCUMENTS 0020664 11/1979 European Pat. Off. .
0137990 8/1984 European Pat. Off. .
0143300 10/1984 European Pat. Off. .
1956473 11/1969 Fed. Rep. of Germany .

OTHER PUBLICATIONS

M. Reid et al., *Improvement and Scale-Up of the NASA Redox Storage System*, U.S. Dept. of Energy (Aug. 1980).
D. Sh. Cheng et al., *The Influence of Thallium on the Redox Reaction of $Cr+3/Cr+2$*, J. Electrochemical Soc. 269 (Feb. 1985).
Patent Abstracts of Japan, vol. II, Nr. 122 (E-500) [2569], *Redox Flow Cell*.
Extended Abstracts, 1046 B, Ab. No. 351, vol. 80-1, *Electrocatalysts for $Cr+3/Cr+2$ Redox Couple*, 874 (May 1980).

Primary Examiner—Anthony Skapars
Attorney, Agent, or Firm—Kenyon & Kenyon

[57] ABSTRACT

The combination of gold, thallium, lead and bismuth is used as a catalyst in a battery comprised of at least one "redox" cell to accelerate the oxidation of chromous ions to chromic ions and the reduction of chromic ions to chromous ions. The gold, thallium, lead and bismuth catalyst is coated on an electronically conductive, inert electrode which is in the anode fluid of the "redox" cell.

11 Claims, 1 Drawing Sheet

REDOX BATTERY

FIELD OF INVENTION

This invention relates to electrochemical cells for storing electrical charges and is directed more particularly to achieving the maximum energy efficiency from reduction-oxidation cells ("redox" cells).

BACKGROUND OF THE INVENTION

"Redox" batteries function as a bulk energy storage system of electric energy and have a very high overall energy efficiency as compared to many other systems. The storage of energy takes place through the solutions of metal ion pairs at differing states of oxidation. If two such ion pairs, whose "redox" potentials deviate sufficiently far from each other, are allowed to react on two different electrodes which are separated from each other by a membrane, then a potential difference is obtained, i.e. electric energy (See, for example, EP-P 0 143 300).

"Redox" pairs of the above mentioned kind are, for example $Fe^{3+}/Fe^{2+}$ and $Cr^{3+}/Cr^{2+}$. In cells containing such "redox" pairs, for example Fe/Cr "redox" cells, the storage of power-upon applying the charging voltage-takes place through the following processes:

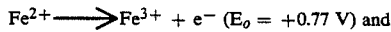

$Fe^{2+} \longrightarrow Fe^{3+} + e^- \quad (E_o = +0.77\ V)$ and

$Cr^{3+} + e^- \longrightarrow Cr^{2+} \quad (E_o = -0.41\ V)$.

The values of the potentials refer to the standard hydrogen electrode. At the positive electrode bivalent iron ions are oxidized while at the negative electrode trivalent chromium ions are reduced. On reversing these processes-reduction of (*) oxidation of bivalent chromium ions ($Cr^{2+}$) at the negative electrode-the stored electric energy is again freed and the discharge voltage can be tapped at the electrodes. Since the (*) trivalent iron ions ($Fe^{3+}$) at the positive electrode and discharge voltage of a single cell is generally too low for technical applications, several "redox" cells are always electrically connected in series by which "redox" batteries result.

"Redox" cells generally are operated with acidic electrolyte solutions, for example with solutions of iron chloride or chromium chloride in hydrochloric acid. The electrochemical reactions take place at electrodes which are inert to the particular electrolyte solutions, i.e. cathode fluid (catolyte) or anode fluid (anolyte). Coal or graphite, which are inert to the anode and cathode fluids, generally serve as electrode material. (See, for example U.S. Pat. No. 3,996,064 and U.S. Pat. No. 4,382,116).

The "redox" reaction of the iron in "redox" cells normally does not present any problems. It takes place particularly when graphite materials are used, at a sufficient rate and with a current yield of nearly 100%. In contrast, the "redox" reaction of the chromium presents problems since it is not catalyzed to a sufficiently great extent by graphite. For that reason, previous attempts have been made to activate the graphite electrodes for the chromium reaction.

A suitable measure for activating the chromium electrode is by coating with metals. For example, gold catalyzes the oxidation of bivalent chromium and the reduction of trivalent chromium so that a sufficient reaction speed can be achieved for the discharge reaction as well as for the charge reaction. However, the hydrogen overvoltage on gold is less than on graphite. Therefore, during the charging process in this case, as a side reaction of the reduction of the trivalent chromium, an undesirable hydrogen formation, occurs. Thus, the current yield of the charging process for the chromium electrolyte is markedly below 100%. As a consequence, the charging state of the chromium solution with each cycle remains further behind the charging state of the iron solution.

The difference between the charging state of the chromium solution and that of the iron solution must be balanced externally with a special cell. (See, for example: M. A. Reid and L. H. Thaller "Improvement and Scale-up of the NASA Redox Storage System", DOE/-NASA/12726-6, NASA TM-81632, 1981). The concepts developed until now for such a "rebalance cell," however, use up energy so that the energy efficiency of the "redox" system is diminished. The higher the rate of hydrogen development at the chromium electrode and, hence, the required power of the rebalance cell, the lower the energy efficiency of the energy storage system.

A further problem arises in this connection with respect to the material balance. The hydrogen formed as a byproduct in the chromium reduction represents a substance loss which, in the interest of a long operating life of the total system, must be compensated for in order to permit a closed cycle.

In order to decrease the hydrogen formation, attempts have been made to use a second catalyst besides gold. Known for this purpose are lead and cadmium (See, for example U.S. Pat. No. 4,192,910 and U.S. Pat. No. 4,270,984) as well as thallium (See, EP-P 0 137 990). However, when applied in practice, the hydrogen overvoltage is also insufficient to suppress the hydrogen development to a sufficient extent.

It is the object of the invention to implement a battery of "redox" cells of the aforementioned type with a catalyst for accelerating $Cr^{3+}/Cr^{2+}$ "redox" processes in such a way that the current yield of the "redox" reaction of the chromium is optimized and, hence, maximum possible energy efficiency is achieved for the overall system.

SUMMARY OF THE INVENTION

In accordance with the present invention, the combination of gold, thallium, lead and bismuth is used as a catalyst for the oxidation of chromous ions to chromic ions in a "redox" cell. It is also used as a catalyst for the reduction of chromic ions to chromous ions in a "redox" cell. The gold, thallium, lead and bismuth catalyst is coated on an inert, electrically conductive electrode of the "redox" cell.

With the Au/Tl/Pb/Bi combination catalyst, efficient catalysis of the reaction at the chromium electrode is achieved. This yields a series of significant advantages for the "redox" system. The hydrogen development is largely suppressed, and thereby a decrease of the inequilibrium of the charging state of the two energy carriers is brought about. In addition, a decreased substance loss occurs which leads to correspondingly low maintenance of the battery. Further, a potentially available rebalance cell requires less power, which effects energy consumption and the investment costs of the peripheral installation. Moreover, the catalyst according to the invention entrains an increase of the current density which corresponds to an improvement of the power density and likewise leads to savings in investment.

DESCRIPTION OF A PREFERRED EMBODIMENT

Figure 1:
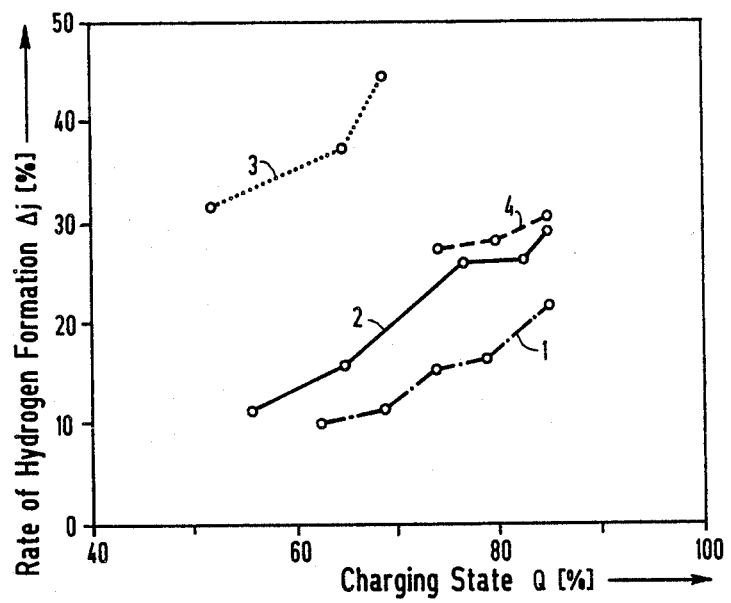
FIG. 1 is a graph illustrating the rate of hydrogen formation as a function of the charging state as carried out with the catalyst of the invention with respect to the catalysts of the prior art on an electrode comprised of fluoroplastic-bound finely flocculent material of natural graphite.

In a preferred embodiment of the "redox" battery according to the invention, the negative electrode has a catalytic coating of gold, thallium, lead, and bismuth. This coating can be generated directly onto the negative electrode, for example, through impregnation with aqueous solutions of corresponding metal salts. Preferentially, however, the metals are applied on the negative electrode in such a manner so that the anolyte, i.e. the chromium electrolyte, contains salts of gold, thallium, lead, and bismuth. During charging, under reducing conditions, the corresponding metals are then deposited, in accordance with their position in the electrochemical voltage series on the negative electrode (chromium electrode).

The concentration of the metal salts in the anolyte are selected such, that on the negative electrode under the precondition that 100% deposition takes place the following surface densities, in each instance relative to 1 $cm^2$, are formed: 0.02 to 1 mg Au, 0.2 to 40 mg Tl, 0.2 to 10 mg Pb, and 0.2 to 10 mg Bi. These values represent, independently of the kind and manner of application of the metals on the electrode surface, the preferred ranges of surface densities. It is particularly advantageous if the negative electrode has approximately the following surface densities: 0.2 $mg/cm^2$ Au, 8 $mg/cm^2$ Tl, 2 $mg/cm^2$ Pb, and 2 $mg/cm^2$ Bi.

In "redox" cells or "redox" batteries, the electrolyte fluid generally is aqueous hydrochloric acid, preferably 3 molar hydrochloric acid. If metal salts are added to the anolyte, these are, therefore preferentially metal chlorides. In particular, the following compounds serve as chlorides: $AuCl_3$, $TlCl_3$, $PbCl_2$, and $BiCl_3$. $AuCl_3$ can also be present in the form of $HAuCl_4$ and TlCl can also be used instead of $TlCl_3$.

The electrode materials used in the "redox" battery according to the invention are in particular, carbon and graphite, which can be utilized in the form of felt. It is preferable that the negative and positive electrodes consist of plastic-bound graphite. The positive electrode is preferably an iron electrode, i.e. an electrode on which $Fe^{3+}/Fe^{2+}$ "redox" processes take place. The positive electrode may also be a manganese or vanadium electrode as well as a bromium electrode. If the "redox" battery according to the invention is a Fe/Cr battery, that is if it has as its positive electrode an iron electrode and as its negative electrode a chromium electrode, then the particular electrolyte fluid contains preferably iron chloride or chromium chloride in an aqueous HCL solution. The catholyte fluid is preferably 1M $FeCl_2$/3M HCl, and the anolyte fluid is preferably 1M $CrCl_3$/3M HCl. The positive and negative electrodes are inert to the anolyte and catholyte fluids and the corresponding electrode chambers (and hence also the catholyte and anolyte) are separated from each other by an ion exchange membrane.

In conjunction with the embodiment examples and figures, the invention will be explained in yet greater detail.

EXAMPLES

The following negative electrodes were examined for the chromium reaction, in each instance with an electrode surface of 5 $cm^2$:

1. An Au/Tl/Pb/Bi electrode according to the invention with 0.2 $mg/cm^2$ Au, 8 $mg/cm^2$ Tl, 2 $mg/cm^2$ Pb, and 2 $mg/cm^2$ Bi (electrode 1); and 2. An Au/Pb electrode corresponding to prior art (See, for example, U.S. Pat. No. 4,192,910 or EP-P 0 020 664) with 0.2 $mg/cm^2$ Au and 2 $mg/cm^2$ Pb (electrode 2); and 3. An Au/Tl electrode corresponding to prior art (See EP-P 0 137 990) with 0.2 $mg/cm^2$ Au and 8 $mg/cm^2$ Tl (electrode 3); and 4. A Pb/Bi electrode with 2 $mg/cm^2$ Pb and 2 $mg/cm^2$ Bi as comparison (electrode 4).

The electrode material used in each case was graphite bound with plastic material. The catalyst material was applied on the electrode in such a manner that appropriate quantities of metal chloride were added to the electrolyte fluid, i.e. to the anolyte. 1M $CrCl_3$/3M HCl served as anolyte. Approximately the same results are obtained if 1M $CrCl_3$/1M $FeCl_2$/3M HCl is used as the electrolyte fluid.

The electrochemical investigations of the above mentioned electrodes took place initially with the delta voltage method which permits rapid overview of the quality of electrode or catalyst materials. It was found that the achievable current densities, for the $Cr^{3+}$ reduction as well as for the $Cr^{2+}$ oxidation, were greatest for electrode 1. The other three investigated electrodes yielded significantly lower current densities for the "redox" reaction of the chromium.

The most important criterion for the quality of a catalyst for the chromium reaction is the proportion of hydrogen development to the reduction current. For this purpose, the electrodes were arranged in a flow apparatus and a constant current was applied, and the rate of hydrogen development in the reduction of $Cr^{3+}$ to $Cr^{2+}$ was determined through volumetric determination of the generated quantity of gas. The quantity of gas here was dependent of the charging state of the chromium electrolyte: at a lower charging state, that is at a high concentration ratio of $Cr^{3+}:Cr^{2+}$, no hydrogen formation takes place and at a higher charging state, gas formation starts.

Figure 2:
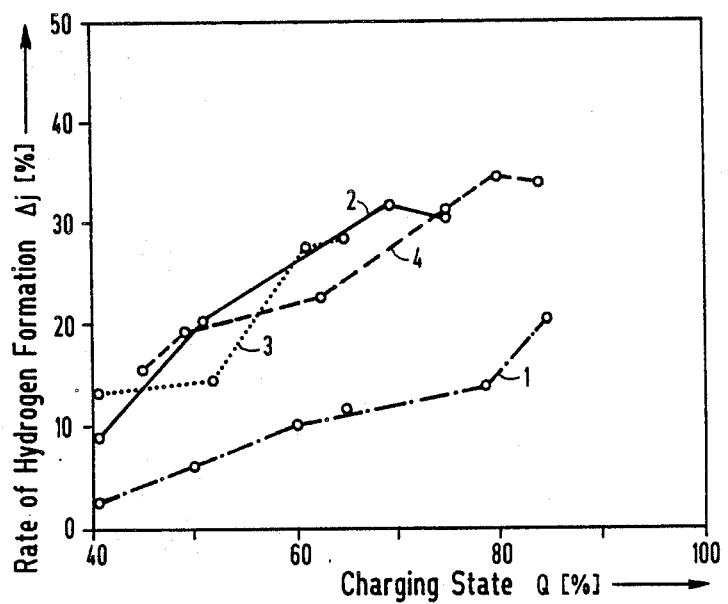
FIG. 2 is a graph showing the rate of hydrogen formation as a function of the charging state as carried out with the catalyst of the invention with respect to the catalysts of the prior art on an electrode comprised of fluoroplastic-bound coarsely flocculent material of natural graphite.

The obtained test results can be found in FIGS. 1 and 2 (numerals 1, 2, 3, and 4 apply to the electrodes with the corresponding number). For the above four described electrodes, the rate of hydrogen formation (given as a percentage of the total current flow) is graphically represented as a function of the charging state (the charging state was calculated with a calibration curve over the resting potential of the measuring electrode). The flow rate of the electrolyte (1M $CrCl_3$/1M $FeCl_2$/3M HCl) on the electrode surface was 250 ml/minute in each case. The current density in each instance was 40 mA/cm$^2$, i.e. the current was 200 mA.

In FIGS. 1 and 2, it can be seen that electrode 1, the electrode with an Au/Tl/Pb/Bi combination catalyst, has by far the lowest rate of hydrogen formation. It was far superior to the known Au/Pb and Au/Tl electrodes (and also to a Pb/Bi electrode). This applied to a chromium and iron-containing electrolyte as well as to an electrolyte containing only chromium ions for the influence of iron ions on the reduction of chromium ions was apparently very weak. The electrode material also exerted, at least as far as electrode 1 is concerned, no decisive effects. The electrodes according to FIG. 1 were based on fluoroplastic-bound finely flocculent material of natural graphite, and the electrodes according to FIG. 2 were based on a fluoroplastic-bound coarsely flocculent material of natural graphite, (plastic binding agent: polyvinylidene fluoride).

Investigations of the different electrodes further showed that with the Au/Tl/Pb/Bi catalyst, especially at high charging states, higher reduction currents could be realized than with the customary catalysts. The invention also showed improved current density, for the discharging process, which meant greater area-related power of the battery. Therefore, in order to achieve the same power, the electrode surface could, consequently, be reduced. For example, the "redox" battery according to the invention could, at the same power, be of smaller size than other batteries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claim.

What is claimed is:

1. A battery comprising:
    at least one "redox" cell, each cell having first and second chambers separated by a membrane;
    a positive electrode disposed in the first chamber;
    a negative electrode disposed in the second chamber;
    a catholyte fluid in said first chamber, said positive electrode being inert to the catholyte fluid; and
    an anolyte fluid in said second chamber, said negative electrode being inert to the anolyte fluid;
    said negative electrode containing a combination of gold (Au), thallium (Tl), lead (Pb), and bismuth (Bi) as a catalyst for the acceleration of $Cr^{3+}/Cr^{2+}$ "redox" processes.

2. The battery according to claim 1 wherein the combination of gold, thallium, lead and bismuth is coated on said negative electrode.

3. The battery according to claim 2, wherein said negative electrode has a surface concentration of 0.02 to 1 mg Au, 0.2 to 40 mg Tl, 0.2 to 10 mg Pb, and 0.2 to 10 mg Bi, in each instance relative to one centimeter square.

4. The battery according to claim 3, wherein said negative electrode has the following surface concentrations: Au about 0.2 mg/cm$^2$, Tl about 8 mg/cm$^2$, Pb about 2 mg/cm$^2$, and Bi about 2 mg/cm$^2$.

5. The battery according to claim 1 wherein the battery is comprised of a series of "redox" cells.

6. The battery according to claim 1, wherein the anolyte fluid contains salts of gold, thallium, lead, and bismuth.

7. The battery according to claim 6, wherein the anolyte fluid contains metal chlorides.

8. The battery according to claim 1, wherein said negative electrode consists of plastic-bound graphite.

9. The battery according to claim 1, wherein said negative electrode is an inert, electrically conductive electrode on which $Cr^{3+}/Cr^{2+}$ "redox" processes take place.

10. The battery according to claim 1, wherein said positive electrode is an inert, electrically conductive electrode on which $Fe^{3+}/Fe^{2+}$, "redox" processes take place.

11. The battery according to claim 1 wherein said positive electrode consists of plastic-bound graphite.

* * * * *